United States Patent
Day et al.

[11] 3,774,263
[45] Nov. 27, 1973

[54] HANDLE ASSEMBLIES FOR ARTICLES OF HOLLOW-WARE

[75] Inventors: John Anthony Day, Kinver; John Melville Graham, Powell Vaughan, Stourbridge, both of England

[73] Assignee: Healey Mouldings Limited, Oldbury, Worley, England

[22] Filed: Nov. 15, 1971

[21] Appl. No.: 198,754

[52] U.S. Cl. ................................... 16/114, 16/110
[51] Int. Cl. ............................................ A47b 95/02
[58] Field of Search ........................ 16/110 A, 114; 220/94, 94 A; 219/148; 24/73 HS

[56] References Cited
UNITED STATES PATENTS
3,616,964  11/1971  Masaru Yamazaki ............ 220/94 R
3,661,296  5/1972  Hamer et al. ...................... 16/110 A Primary Examiner—Francis K. Zugel
Assistant Examiner—Doris L. Troutman
Attorney—Charles J. Merriam

[57] ABSTRACT

A handle assembly for an article of hollow-ware includes a handle in the form of a one-piece moulding of a synthetic plastics material which provides a handgrip portion and an attachment portion. The attachment portion is formed with a recess to receive an attachment bracket for fastening to the article and the recess is bounded by an upper flange and a pair of side flanges.

2 Claims, 2 Drawing Figures

Patented Nov. 27, 1973

3,774,263

HANDLE ASSEMBLIES FOR ARTICLES OF HOLLOW-WARE

BACKGROUND OF THE INVENTION

1. Field of the Invention

This invention relates to handle assemblies for articles of hollow-ware.

2. Description of the Prior Art

Handle assemblies are known in which the handle is a plastics moulding which provides a hand grip and in which an attachment bracket is used to connect the handle to a side of an article of hollow-ware.

It is an object of the invention to provide an improved handle assembly in which the handle includes an attachment portion the configuration of which is such as to facilitate moulding thereof. It is a further object of the invention to provide a handle assembly which can be connected to an article of hollow-ware in an extremely and highly effective manner.

SUMMARY OF THE INVENTION

The handle includes an attachment portion formed with a recess to receive the attachment bracket and this recess is bounded by an upper flange and a pair of side flanges.

DESCRIPTION OF THE PREFERRED EMBODIMENTS.

Figure 2:
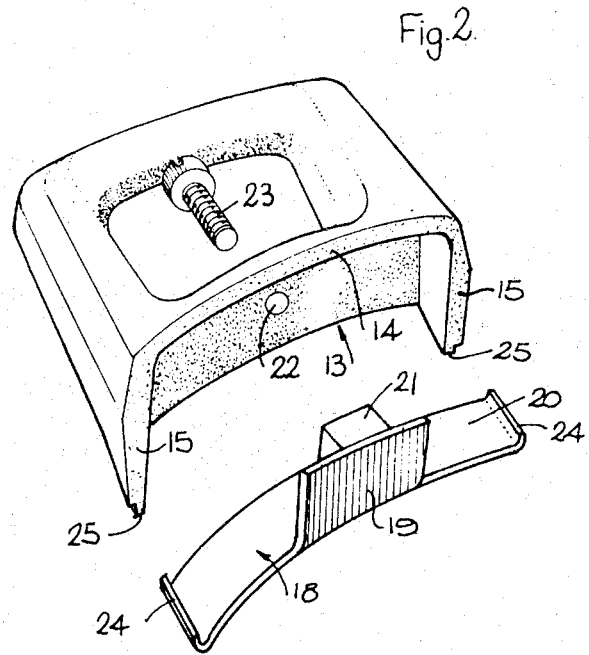

The handle 10 shown in the drawing is formed as a one-piece moulding of a synthetic plastics material and is moulded in a straight forward open and closed tool, the handle being of generally rectangular shape in plan. One longer side 11 thereof is curved to a radius corresponding to that of the saucepan 12 with which the handle is intended to be used. Viewed in front elevation, i.e. looking towards the curved face of the handle, said face is recessed as shown in FIG. 2 over the major part of its area so as to define a substantially rectangular recess 13 which is bounded by an upper flange 14 and a pair of side flanges 15 so that the recess is, in effect, open-faced at the bottom. By having a recess in the insitu lower part of the handle, the manufacturer is enabled to use a straight forward open and closed tool for the moulding of the handle and does not have to make use of side cores.

Side 11 of the handle with the recessed face constitutes the attachment portion of the handle and the opposed longer side 16 of the handle constitutes the hand grip portion, the handle being provided with a through opening of substantially rectangular form when viewed in plan so that the hand grip portion 16 is, in effect, spaced from the attachment portion by the two shorter sides 17 of the handle which serve to connect the hand grip portion 16 to the attachment portion 11. The attachment portion 11 of the handle is deeper than the hand grip portion 16 so that, when viewed in side elevation, the handle has a generally truncated triangular shape as can be seen best from FIG. 1. In order to present an aesthetically pleasing appearance that surface of the handle which is uppermost can be chamfered or curved downwardly towards the central through opening as shown in the drawing. The handle is attached to the saucepan 12 through the intermediary of an attachment bracket 18 which includes an attachment limb 19 so that the bracket 18 can be secured to the saucepan 12 by riveting, spot welding or like operation. A guard limb 20 projects from the attachment limb 19 in a direction forwardly therefrom, i.e. in a direction away from the saucepan 12, the guard limb 20 being of substantially rectangular form. Mounted on the front face of the attachment limb 19 is a stud or nut 21 which has a tapped opening therein so that the handle 10 can be secured to the bracket 18, the attachment portion 11 of the handle being formed with a through opening 22 through which the shank of a headed threaded fastener 23 can be passed to secure the handle 10 and bracket 18 together.

Instead of attaching limb 19 of the bracket 18 directly to the saucepan, the attachment limb 19 can be provided with a centrally disposed aperture whereby the limb 19 can be positioned over a projecting stud welded to the saucepan, the stud being provided with an axially extending tapped hole for engagement by the threaded fastener 23 so that the bracket is, in effect, held in position by the handle. As a further alternative the attachment limb 19 can be provided centrally with a forwardly directed U-shaped portion which defines a pocket into which an attachment nut can be placed, the base of this U-shaped portion being provided with an opening adapted to register with the oening in the nut and the dimensions of the U-shaped portion being such as to restrain the nut against rotation. The threaded fastener 23 then passes through the opening 22 in the attachment portion 11 of the handle, through the opening in the base of the U-shaped portion to engage the nut. In this further alternative case the attachment limb 19 of the bracket 18 is secured directly to the saucepan.

Figure 1:
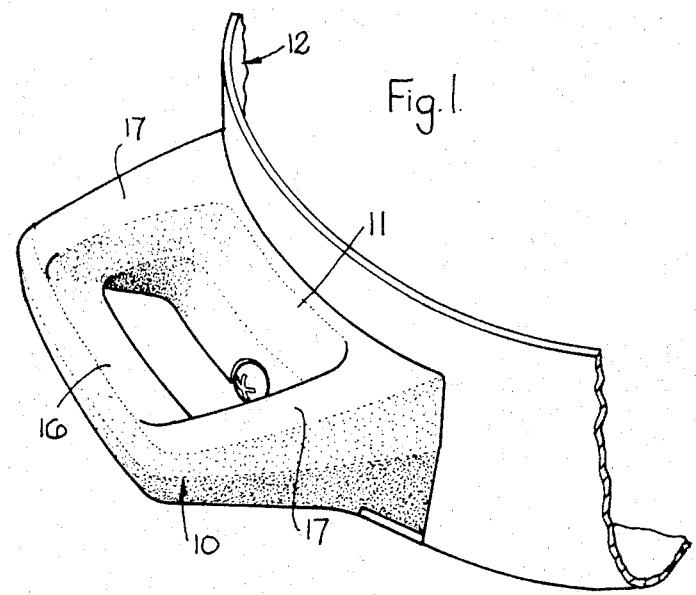
FIG. 1 is a perspective view showing a side handle connected to a side wall of a saucepan and FIG. 2 is a perspective view of the components of the handle assembly.

When the handle 10 is mounted in position on the bracket 18, the guard limb 20 of the bracket 18 locates on the lower edges of the side flanges 15 of the handle and, in effect, closes the lower side of the recess 13. When, therefore, the handle is in position as shown in FIG. 1, the recess 13 is bounded by the upper and side flanges 14 and 15 respectively, by the base of the recess, by the guard limb 20 of the bracket 18, by the attachment limb 19 of the bracket 18 and by the side face of the saucepan, the arrangement being such that the attachment limb 19 does not extend for the full width of the attachment portion 11 of the handle 10.

To facilitate location of the handle 10 relative to the bracket 18 and to present a neat finished appearance, the side edges 24 of the guard limb 20 are upturned as shown in FIG. 2 and the lower edges 25 of the side flanges 15 of the handle are cut away as shown in FIG. 2 on their outer faces to receive and locate the turned up edges 24 of the guard limb of the bracket.

The provision of the recess 13 in the attachment portion 11 of the handle facilitates moulding of the handle in that it enables a straight forward open and closed moulding tool to be used without the necessity of incorporating side cores in the tool and the attachment bracket 18 fits flush with the handle 10 thus providing neat appearance whilst the guard limb 20 of the bracket serves as a flame guard to prevent inadvertent disfiguration or other damage to the handle as may occur if the saucepan is left on, for example, a high gas jet.

Although the invention has been described and illustrated in relation to a side handle for a saucepan, the arrangement of attachment bracket and recessed face of the attachment portion of the handle can be used in connection with the conventional form of elongated saucepan handle.

We claim:

1. A handle assembly for fitting to an article of hollow-ware, said handle assembly comprising a handle which is formed as a one-piece moulding of a synthetic plastics material and has a hand grip portion and an attachment portion for connection to an article, said attachment portion including an upper flange and two spaced side flanges defining a recess which, when the handle assembly is fitted to an article, opens downwardly and towards the article; and an attachment means including a connector which is disposed in said recess in the attachment portion of the handle for connection of said attachment portion to an article, and a metal plate which closes the open lower side of said recess thereby to act as a flame guard.

2. A handle assembly according to claim 1 in which the side edges of the plate of the attachment means are upturned and the lower edges of the side flanges of the attachment portion of the handle are provided with rebates to receive said upturned edges.

\* \* \* \* \*